United States Patent [19]
Yoshida et al.

[11] Patent Number: 5,388,093
[45] Date of Patent: Feb. 7, 1995

[54] DISC RECORDING AND/OR REPRODUCING APPARATUS FOR RECORDING CONTINUOUS COMPRESSED DATA IN PLURAL DATA REGIONS AND DISC THEREFOR

[75] Inventors: Tadao Yoshida, Kanagawa; Takashi Ohmori, Tokyo, both of Japan

[73] Assignee: Sony Corporation, Tokyo, Japan

[21] Appl. No.: 945,488

[22] Filed: Sep. 16, 1992

[30] Foreign Application Priority Data

Sep. 27, 1991 [JP] Japan .................................. 3-275067

[51] Int. Cl.⁶ ...................... G11B 7/007; G11B 7/013
[52] U.S. Cl. ................................. 369/124; 369/275.3
[58] Field of Search ...................... 369/124, 275.3, 47, 369/48, 58; 360/50, 48

[56] References Cited

U.S. PATENT DOCUMENTS

| 4,075,665 | 2/1978 | Borne et al. | |
|---|---|---|---|
| 4,413,289 | 11/1983 | Weaver et al. | 360/51 |
| 4,754,483 | 6/1988 | Weaver | 381/36 |
| 4,791,623 | 12/1988 | Deiotte | 369/59 |
| 4,882,754 | 11/1989 | Weaver et al. | 381/35 |
| 5,214,631 | 5/1993 | Maeda et al. | 369/59 |
| 5,224,087 | 6/1993 | Maeda et al. | 369/54 |
| 5,272,691 | 12/1993 | Watanabe | 369/124 |
| 5,317,553 | 5/1994 | Ohga et al. | 369/124 |

FOREIGN PATENT DOCUMENTS

| 0426872A1 | 5/1991 | European Pat. Off. . |
| 0463183A1 | 1/1992 | European Pat. Off. . |
| WO80/01328 | 6/1980 | WIPO . |
| WO91/14265 | 9/1991 | WIPO . |

Primary Examiner—Paul M. Dzierzynski
Assistant Examiner—David V. Bruce
Attorney, Agent, or Firm—Limbach & Limbach

[57] ABSTRACT

A disc recording apparatus in which continuous recording data is subdivided and recorded in plural recording zones of the disc in the subdivided state, is disclosed. A system controller controls the recording position and the reproducing position of the recording data with respect to data zones of a recording/reproducing region of a magneto-optical disc. The continuous recording data are subdivided for recording in plural data recording zones, while track number data indicating the continuous recording data recorded in the data zones, address data indicating the positions of the data zones and address data indicating the linking destination for one to another data zone, are recorded in a lead-in region of the recording/reproducing region under control of the system controller. A disc reproducing apparatus for reproducing the recorded data recorded by the disc recording apparatus and a disc-shaped recording medium used in the disc recording apparatus and in the disc reproducing apparatus are also disclosed.

8 Claims, 9 Drawing Sheets

| TRACK NUMBER TNOn | START AND END | MINUTE | SECOND | FRAME |
|---|---|---|---|---|
| 1 | 0 | 0 0 | 0 0 | 0 0 |
| 1 | 1 | 1 5 | 0 4 | 0 0 |
| 2 | 0 | 3 0 | 0 0 | 0 6 |
| 2 | 1 | 4 5 | 0 0 | 0 0 |

| | L CHANNEL | | R CHANNEL | | |
|---|---|---|---|---|---|
| 0 | 00000000 | 11111111 | 11111111 | 11111111 | HEADER |
| 1 | 11111111 | 11111111 | 11111111 | 11111111 | |
| 2 | 11111111 | 11111111 | 11111111 | 00000000 | |
| 3 | CLUSTER | CLUSTER | 00000000 | 00000010 | |
| 4 | 00000000 | 00000000 | 00000000 | 00000000 | |
| 5 | 00000000 | 00000000 | 00000000 | 00000000 | |
| 6 | | | | | |
| 7 | | | FIRST TNO | LAST TNO | |
| 8 | | | | | |
| 9 | | | | | |
| 10 | | | | | |
| 11 | | | | P-FAT | |
| 12 | P-FRA | P-TNO 1 | P-TNO 2 | P-TNO 3 | |
| 13 | P-TNO 4 | P-TNO 5 | P-TNO 6 | P-TNO 7 | |
| 14 | P-TNO 8 | P-TNO 9 | P-TNO 10 | P-TNO 11 | |
| 15 | P-TNO 12 | P-TNO 13 | P-TNO 14 | P-TNO 15 | |
| 16 | P-TNO 16 | | | | |
| 17 | | | | | |
| 73 | | | | | DATA AREA (2336 BYTE) |
| 74 | P-TNO 248 | P-TNO 249 | P-TNO 250 | P-TNO 251 | |
| 75 | P-TNO 252 | P-TNO 253 | P-TNO 254 | P-TNO 255 | |
| 76 | START ADDRESS | | | | |
| 77 | END ADDRESS | | | LINK-P | |
| 78 | START ADDRESS | | | TRACK MODE | |
| 79 | END ADDRESS | | | LINK-P | |
| 80 | START ADDRESS | | | TRACK MODE | |
| 81 | END ADDRESS | | | LINK-P | |
| 82 | START ADDRESS | | | TRACK MODE | |
| 83 | END ADDRESS | | | LINK-P | |
| 84 | START ADDRESS | | | TRACK MODE | |
| 85 | END ADDRESS | | | LINK-P | |
| 86 | | | | | |
| 481 | | | | | |
| 482 | | | | | |
| 534 | | | | | |
| 535 | | | | | |
| 586 | | | | | |
| 587 | | | | | |

(X4 BYTE)

FIG. 5

| 1 2 | P-FRA=[00]H | TNO 01=[01]H | TNO 02=[03]H | |
|---|---|---|---|---|
| [00]H → 76 | 0 1 | C4 | 0 0 | MODE |
| 77 | 0 3 | 8 3 | 1 F | 0 2 |
| [01]H → 78 | 0 0 | 0 0 | 0 0 | MODE |
| 79 | 0 1 | C3 | 1 F | 0 0 |
| [02]H → 80 | 0 5 | 4 6 | 0 0 | MODE |
| 81 | 0 7 | 0 8 | 1 F | 0 0 |
| [03]H → 82 | 0 3 | 8 4 | 0 0 | MODE |
| 83 | 0 5 | 4 5 | 1 F | 0 0 |
| [04]H → 84 | | | | |

| 1 2 | P-FRA=[00]H | TNO 01=[01]H | TNO 02=[03]H | TNO 03=[02]H |
|---|---|---|---|---|
| [00]H → 76 | 0 5 | D D | 0 0 | MODE |
| 77 | 0 7 | 0 8 | 1 F | 0 0 |
| [01]H → 78 | 0 0 | 0 0 | 0 0 | MODE |
| 79 | 0 1 | C 3 | 1 F | 0 0 |
| [02]H → 80 | 0 1 | C 4 | 0 0 | MODE |
| 81 | 0 3 | 8 3 | 1 F | 0 4 |
| [03]H → 82 | 0 3 | 8 4 | 0 0 | MODE |
| 83 | 0 5 | 4 5 | 1 F | 0 0 |
| [04]H → 84 | 0 5 | 4 6 | 0 0 | MODE |
| 85 | 0 5 | D C | 1 F | 0 0 |
| [05]H → 86 | | | | |

| TRACK NUMBER TNOn | START AND END | MINUTE | SECOND | FRAME | COUPLING FLAG |
|---|---|---|---|---|---|
| 1 | 0 | 0 0 | 0 0 | 0 0 | |
| 1 | 1 | 1 5 | 0 4 | 0 0 | 1 |
| 1 | 0 | 3 0 | 0 0 | 0 6 | |
| 1 | 1 | 4 5 | 0 0 | 0 0 | 0 |

DISC RECORDING AND/OR REPRODUCING APPARATUS FOR RECORDING CONTINUOUS COMPRESSED DATA IN PLURAL DATA REGIONS AND DISC THEREFOR

BACKGROUND OF THE INVENTION

1. Field of the Invention

This invention relates to a disc recording apparatus for subdividing continuous recording data and recording the subdivided recording data in plural data regions, a disc reproducing apparatus for reproducing the continuous recording data subdivided and recorded by the disc recording apparatus, and a disc employed in the disc recording apparatus and the disc recording apparatus.

2. Description of the Prior Art

An optical disc may have a recording capacity larger by two to three orders of magnitude than that of a magnetic disc and may be accessed at a higher speed as compared to a tape-shaped recording medium. Besides, the optical disc is superior in durability, and data recording/reproduction may be made in a contact-free manner on or from the recording medium. For this reason, the optical disc has become very popular in recent years. As such, one optical disc, a so-called compact disc (CD), is known most extensively.

With the compact disc, a data format is prescribed, in which 8-bit-per-symbol signals are converted into 14-bit signals (channel bits) by eight to fourteen modulation (EFM) and each frame is made up of 24 bit synch signals, 14-bit (1-symbol) subcode, 14×32 bit (32 symbol) data, such as play data and parity data, and 3 bits each between neighboring symbols, making up a total of 588 bits, with 98 frames making up a subcode block. The absolute address of each subcode block is designated by Q-channel subcode signals, and data such as play data are processed with one subcode block as a unit. Besides, a lead-in region is provided on the compact disc on a radially inner side of a data region in which the play information etc. is recorded. In this lead-in region, there are sequentially recorded, as table-of-contents data or TOC data indicating the recording positions in the data region, a time code indicating the start positions of airs, numbers of a first air and the last air of the disc, an number of the last air and the end position of the last air, which are sub-coded and recorded as sub-code signals of the Q-channel.

On the other hand, in a CD-interactive (CD-I) format, the following levels, shown in Table 1, are prescribed as the modes for recording/reproducing bit-compressed digital audio signals.

TABLE 1

| LEVEL | SAMPLING FREQUENCY | NUMBER OF QUANTIZATION BITS | BANDWIDTH | PLAYBACK TIME STEREO/MONAURAL |
|---|---|---|---|---|
| A | 37.8kHz | 8 | 17kHz | 2/4 |
| B | 37.8kHz | 4 | 17kHz | 4/8 |
| C | 18.9kHz | 4 | 8.5kHz | 8/16 |

Referring to Table 1, if a disc recorded with a level B mode is to be reproduced, digital signals of the standard CD-DA format which have been bit-compressed by a factor of about four are reproduced. As a consequence, if all of the recording data are stereo audio compressed data, data may be reproduced over a fourfold time period or four-channel data may be reproduced, such that recording/reproduction over about 70 minutes may be made by an optical disc having a radius of 8 cm or less.

Meanwhile, when a portable, above all, a pocket size headphone stereo device or a similar recording/reproducing device is to be provided, using an optical disc, a disc with a disc diameter of 12 cm and a disc with a disc diameter of 8 cm (a so-called CD single) is prescribed in format. Since the recording/reproducing apparatus is increased excessively in size and is poor in portability with the disc 12 cm in diameter, it may be contemplated to use a disc which is 8 cm or less in diameter. However, the following problem is raised when the pocket size recording/reproducing apparatus is to be constituted with the use of an optical disc 8 cm or less in diameter.

First, in a standard CD format in which an optical disc on which stereo digital PCN audio signals are recorded with a sampling frequency of 44.1 kHz and a number of quantization of bits of 16 is supplied by a producer for solely reproduction by the user (CD-DA format), the playback time (recording time) of the disc 8 cm in diameter is as short as 20 to 22 minutes at the maximum, so that a symphony of a classic music cannot be recorded on the disc. The playback time of 74 minutes or longer, which is similar to that with the current 12 cm CD, is desirable. On the other hand, it is not possible for the user to make recording with the CD-DA system. Besides, the non-contact optical pickup device is vulnerable to mechanical shock and subject to detracking or defocusing when subjected to vibrations. Consequently, if the apparatus is to be of a portable type, it is necessary to take some strong measures for inhibiting any adverse effects on the reproducing operation otherwise caused by detracking or defocusing, Next, with a CD-MO format, or format employing a recordable magneto-optical disc, as an extension format of the abovementioned CD-DA format the recording/reproducing time of the disc 8 m in diameter is of the order of 20 to 22 minutes, as is that with the CD-DA format. Besides, the optical pickup device is subject to detracking and defocusing as a result of mechanical vibrations, so that it is desired to take measures for inhibiting any adverse effects on the recording or reproducing operations.

Meanwhile, with the above-mentioned CD-I format, the disc is rotationally driven at the same linear velocity as that of the standard CD-DA format so that continuous compressed audio data are reproduced at a rate of one unit per n recording units on the disc. This unit is termed a block or sector, with each block (sector) being made up of 98 frames with a period of 1/75 second. The number n is dependent on the playback time or the bit compression rate of the data and is equal to 4 (n=4) with e.g. the level B stereo mode. Consequently, with the level B stereo mode, a data string

*SDDDSDDD* where S is an audio sector and D is other sectors, is recorded on the sector-by-sector basis on the disc. However, when actually recording data, the data string undergoes predetermined encoding similar to that applied to the usual CD format audio data, such as error coding and interleaving, so that the data of the audio sector S and data of the data sectors D are arrayed in a scrambled manner in the recording sectors on the disc. The other data sectors D may include e.g., video or computer data. If bit-compressed audio signals are employed in these data sectors, a data string of cyclically arrayed 4-channel audio sectors S1 to S4, that is a data string [S1, S2, S3, S4, S1, S2, S3, S4], is recorded after encoding on the disc.

In recording and reproducing continuous audio signals, the 4-channel audio signals are linked from the first channel to the fourth channel. Continuous reproduction for a fourfold time interval may be made at this time by reproducing data corresponding to the audio sector S1 from the inner most region to the outer most region of the disc, then reverting to the inner most region for reproducing second channel data corresponding to the audio sector S2 to the outer most region, then reproducing third channel data corresponding to the audio sector S3 from the inner most region to the outer most region of the disc and finally by reproducing data of the fourth channel data corresponding to the audio sector S4 from the inner most region to the outer most region of the disc.

However, for the above-mentioned continuous reproduction, long-distance track jumps need to be made repeatedly for reverting from the outer most region to the inner most region. Since the track jumps cannot be effected instantly, the playback sound is interrupted during this time because of the absence of the playback data. Besides, when recording continuous audio signals, it is not possible to record only signals of, for example, the sector S2, but it becomes necessary to interleave data of the directly neighboring sectors S1 and S3 and other neighboring sectors, so that it becomes necessary to rewrite signals of the recorded sectors, Consequently, it is extremely difficult to record the compressed continuous audio data.

Meanwhile, with the conventional CD-MO format, similarly to the above-mentioned standard CD-DA format, beginning and end addresses are recorded as TOC data. With the CD-MO system, continuous data needs to be recorded in a continuous region because the information is lost by accessing a non-continuous region. Since continuous data cannot be subdivided for recording in plural regions with the customary CD-MO format, recording can be made only in a continuous vacant region if it is desired to re-record data on a track from which previous recording has been erased, or to perform an editing operation. It is assumed that, in the case of a magneto-optical disc having a recordable region of up to 60 minutes, as shown in FIG. 1, first play data are recorded in a data zone $D_1$ of from 0 minute to 15 minute, and second play data are recorded in a data zone $D_3$ of from 30 minute to 45 minute, while no data are recorded in a data zone $D_2$ of from 15 minute to 30 minute or a data zone $D_4$ of from 45 minute to 60 minute. Referring to FIG. 2, a track number data "1", indicating the first play data, a recording start data "0", a recording start position data "00 minute 00 second 00 frame", a track number data "1" indicating the first play data, a recording end data "0" and a recording start position data "15 minute 04 second 00 frame" are recorded in the lead-in region as the information indicating that the first play data have been recorded in the data region of from 0 minute to 15 minute. Similarly, a track number data "2" indicating the second play data, a recording start data "0", a recording start position data "30 minute 00 second 06 frame", a track number data "2" indicating the second play data, a recording end data "0" and a recording start position data "45 minute 00 second 00 frame" are recorded in the lead-in region as the information indicating that the second play data have been recorded in the data region of from 30 minute to 45 minute. If the third play data are recorded on the magneto-optical disc, recording cannot be made over the vacant data zones $D_2$ and $D_4$, but can be made only in the range of the recording capacity of one of the data zones $D_2$ and $D_4$.

In view of the above-described status of the art, it is an object of the present invention to provide a disc recording apparatus in which continuous recording data can be subdivided for being recorded in plural data regions.

It is another object of the present invention to provide a disc reproducing apparatus in which continuous recording data subdivided for being recorded on the disc may be reproduced.

It is yet another object of the present invention to provide a disc in which continuous recording data are subdivided and recorded thereon and in which the continuous data recorded in this manner may be reproduced.

The present invention provides a disc recording apparatus in which compressed input data are stored in a memory and read out therefrom in a burst manner for being recorded in a data region of a disc, and in which data indicating the recording contents of said recording region are recorded in a lead-in region of said disc, comprising data recording means for subdividing input continuous compressed data for recording the subdivided data in plural non-continuous data zones on said disc, and lead-in data recording means for recording track number data associated with the continuous compressed data, address data indicating the positions of said data zones associated with said track number data and address data indicating the linking destination of said compressed data recorded in a given data region.

The present invention also provides a disc reproducing apparatus in which continuous recording data are subdivided and recorded in plural data zones of the disc and in which track number data indicating continuous recording data recorded in each data zone, address data indicating the position of each data zone and linking address data indicating the linking destination from one recording zone to another are recorded in a lead-in region of the disc, comprising lead-in data reproducing means for reproducing the track number data, address data and the linking address data from the lead-in region, and reproducing means for reproducing the continuous recording data from the recording zones of said disc based on said track number data, address data and the linking address data reproduced by said lead-in data reproducing means, The present invention also provides a disc comprising plural recording zones in which continuous recording data are subdivided and recorded in the subdivided state, and a lead-in region in which track number data indicating continuous recording data recorded in each recording zone, address data indicating the position of each data zone, and linking address data indicating the linking destination from one to another data zone are recorded, In the disc recording apparatus of the present invention, continuous recording data are subdivided and recorded in this state in plural recording zones of the disc, while the track number data indicating the continuous recording data recorded in each data zone, address data indicating the position of each data region and address data indicating the linking destination from one to another data zone.

In the disc reproducing apparatus of the present invention, a disc in which continuous recording data is subdivided and recorded in plural data regions and in which track number data indicating the continuous recording data recorded in each recording zone, address data indicating the position of each data zone and linking address data indicating the linking destination from one to another data zone are recorded in a lead-in region is reproduced by reproducing the track number data, address data and the linking address data from the lead-in region by lead-in data reproducing means, and by reading the continuous recording data from the plural data zones of the disc based on the track number data, address data and the linking address data by reproducing means, In the disc of the present invention, continuous recording data are subdivided and recorded in plural data zones. On the other hand, track number data indicating the continuous recording data recorded in each data zone, address data indicating the position of each data zone and linking address data indicating the linking destination from one to another data zone are recorded in the lead-in region.

BRIEF DESCRIPTION OF THE DRAWINGS

FIG. 5 is a diagrammatic view showing a data table of TOC data recorded in the lead-in region of the magneto-optical disc.

EMBODIMENTS

Figures 1, 2:
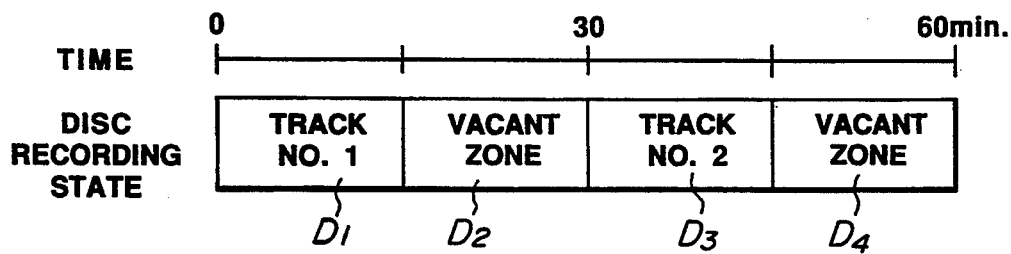
FIG. 1 is a diagrammatic view showing the recording state of a data region of a conventional disc.
FIG. 2 is a diagrammatic view showing the contents of TOC data associated with the recording state of the recording region of the disc shown in FIG. 1.
Figure 3:
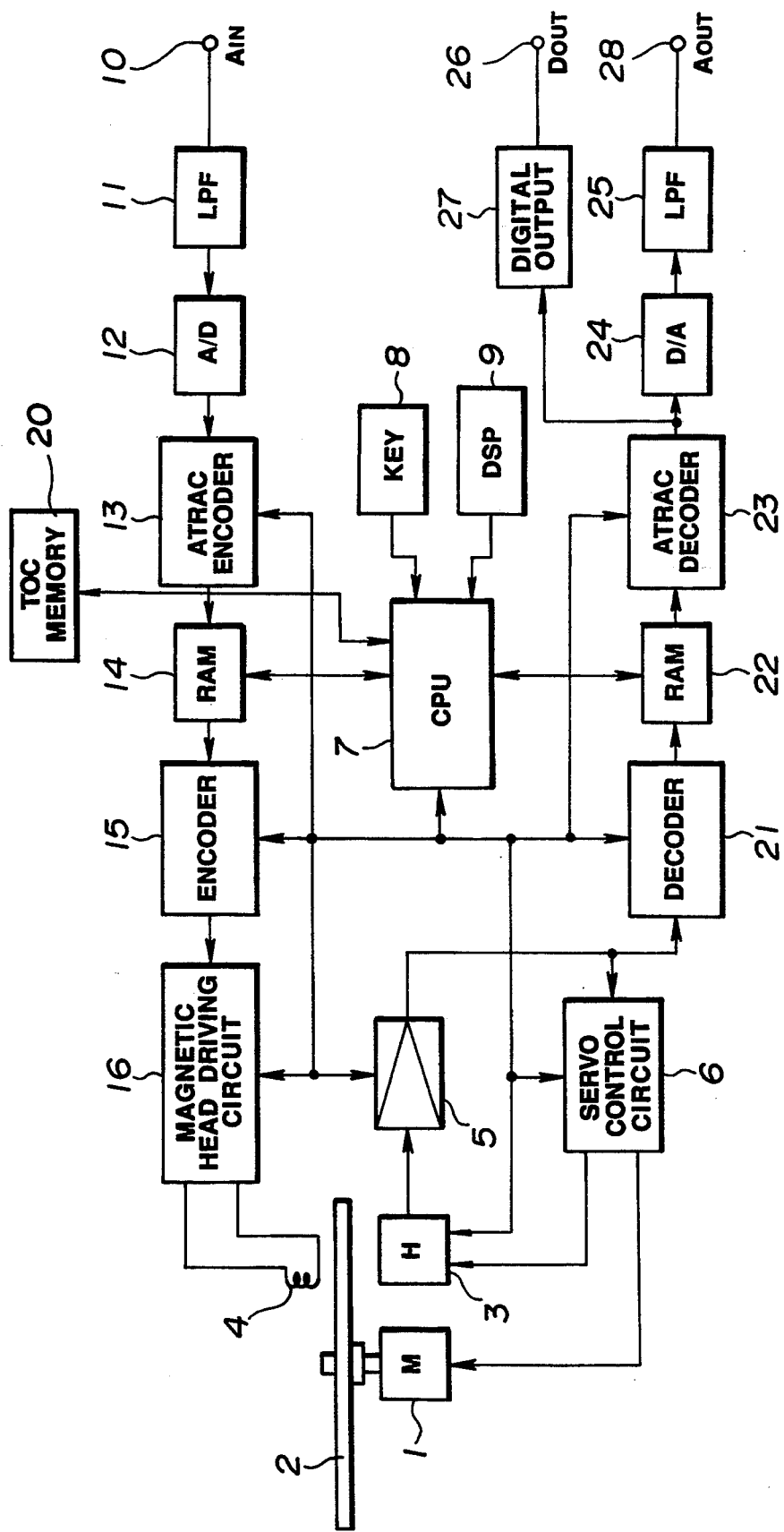
FIG. 3 is a block diagram showing an embodiment of an optical disc recording/reproducing apparatus according to the present invention.

FIG. 3 shows, in a block circuit diagram, a schematic arrangement of an optical disc recording/reproducing apparatus embodying the present invention.

Figure 4:
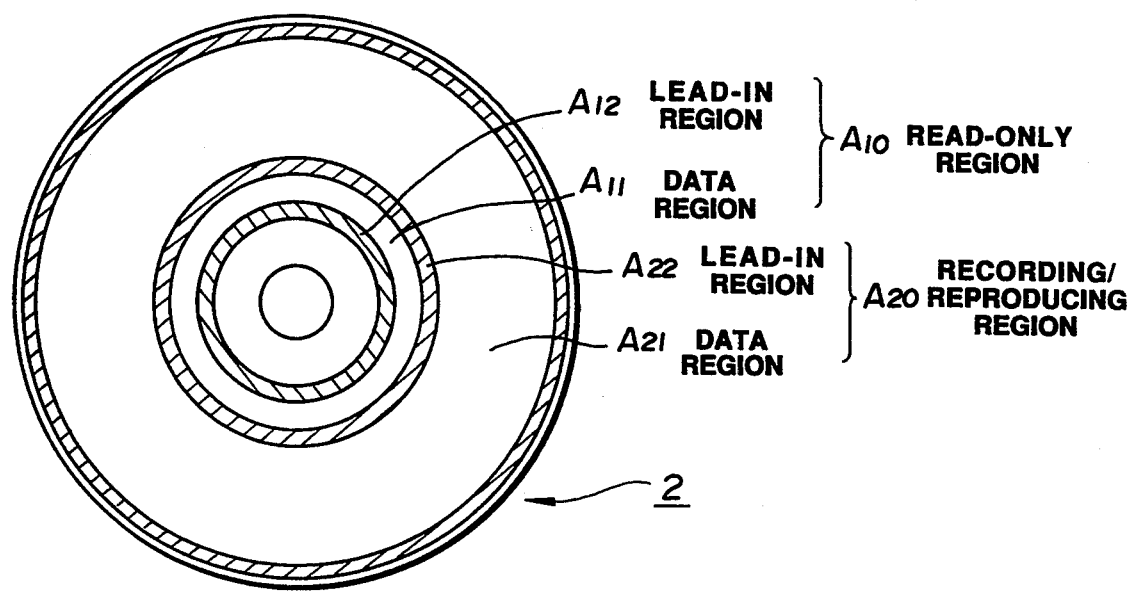
FIG. 4 is a schematic plan view for illustrating the structure of a magneto-optical disc employed in the optical disc recording/reproducing apparatus shown in FIG. 3.

The optical disc recording/reproducing apparatus shown in FIG. 3 may be used in conjunction with a magneto-optical disc having a recording/reproducing region capable of data recording and data reproduction, a read-only optical disc having a read-only region for recorded data, or a magneto-optical disc having a recording/reproducing region capable of data recording and reproduction and a read-only region for recorded data. The disc may be rotationally driven by a spindle motor 1. The following description is made of the magneto-optical disc 2 having a read-only region $A_{10}$ and a recording/reproducing region $A_{20}$ radially outwardly of the read-only region $A_{10}$, as shown in FIG. 4. The disc 2 is adapted for being rotationally driven by the spindle motor 1.

The read-only region $A_{10}$ of the magneto-optical disc 2 includes a data region $A_{11}$ in which data such as play data is recorded and a lead-in region $A_{12}$ provided radially inwardly of the data region $A_{11}$. In the read-only region $A_{10}$, digital data are recorded as pits and lands associated with "1" and "0".

In the lead-in region $A_{12}$, recording start address data and recording end address data are recorded for all of the play data as table-of-contents data or TOC data indicating the recording positions or recording contents of the data region $A_{11}$.

The recording/reproducing region $A_{20}$ of the optical disc 1 includes a data region $A_{21}$ for recording data such as play data and a lead-in region $A_{22}$ provided radially inwardly of the data region $A_{21}$. The recording/reproducing region $A_{20}$ is the region for the magneto-optical recording medium. In the lead-in region $A_{22}$, there are recorded, as TOC data indicating the recording positions or the recording contents of the recording data recorded in the data region $A_{21}$, track number data indicating continuous recording data recorded in each data region, address data indicating the positions of the data regions, and linking address data indicating the linking from a data region to another data region of destination.

In the present embodiment, the TOC data are recorded in the lead-in region $A_{22}$, as main data contiguous to 16-byte header data, as shown in a data table shown in the diagrammatic view of FIG. 5. In the data table, shown in FIG. 5, vertical addresses 0 to 3, each consisting of 4 bytes, are those for header data, 12 bytes of the vertical addresses 0 to 2 are synchronizing signals and first and second bytes of the vertical address 3 are allocated to cluster addresses. The fourth byte of the vertical address 11 is allocated to a pointer P-FAT indicating a vacant region in the data table.

The region of the vertical addresses 12 to 16 make up a track number table, with the first byte of the vertical address 12 being allocated to a pointer P-FRA of a start address of a recordable region for the recording data. The second byte of the vertical address 12 to the fourth byte of the vertical address 75 are allocated to pointers P-TNO$_n$ of start addresses for track numbers n. The values of the pointers P-TNO$_n$ indicate offset positions providing start addresses of the track numbers TNO-n provided by start addresses=76×4+(P-TNOn)×8.

The vertical addresses 76 to 85 make up an address table of the data region and are allocated to start and end addresses of the data regions designated by the 5 pointers P-FRA and P-TNOn. First to third bytes of even-numbered addresses of the vertical address 76 ff. are allocated to start addresses of the data region, while first to third bytes of odd-numbered addresses of the vertical addresses 76 ff. are allocated to end addresses of the data region. Fourth bytes of even-numbered addresses of the vertical addresses 76 ff. are allocated to various track mode data such as copyright protecting mode or overwrite inhibiting mode. Fourth bytes of odd-numbered addresses of the vertical addresses 76 ff. are allocated to pointers Link-P indicating the linking destination from a given data region to another data region.

Figures 6, 7:
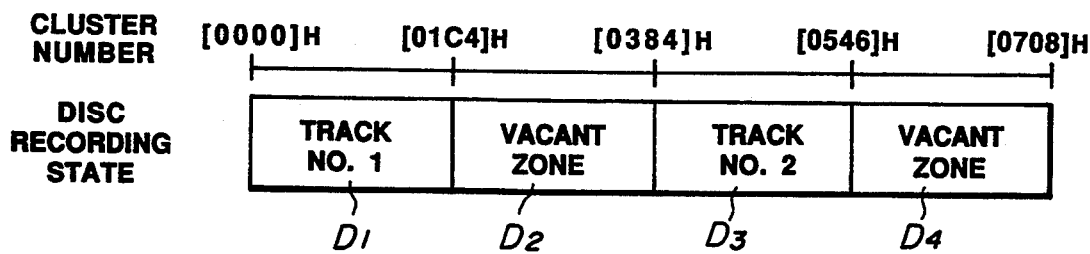
FIG. 6 is a diagrammatic view showing the recording state of the data region of the magneto-optical disc.
FIG. 7 is a diagrammatic view showing the contents of TOC data associated with the recording state of the recording region of the disc shown in FIG. 6.

It is now assumed that, as shown in FIG. 6, first play data are recorded in a data zone $D_1$ from a cluster $[000]_H$ to a cluster $[1C4]_H$, a data zone $D_2$ from cluster $[1C4]_H$ to cluster $[384]_H$ is a vacant zone, second play data are recorded in a data zone $D_3$ from cluster $[384]_H$ to cluster $[546]_H$ and a data zone $D_4$ from cluster $[546]_H$ to cluster $[708]_H$ is a vacant zone. TOC data shown in a TOC data table shown in the diagrammatic view of FIG. 7 are then recorded in the lead-in region $A_{22}$. That is, since the vertical addresses 84 ff. of the TOC data table are vacant, $[04]_H$ indicating the vertical address 84 is recorded as P-FAT data of the fourth byte of the vertical address 11. On the other hand, $[00]_H$ indicating the vertical address 76 is recorded as P-FRA data of the first byte of the vertical address 12. $[01]_H$ indicating the vertical address 78 is recorded as a pointer P-TN01 of the second byte of the vertical address 12. $[03]_H$ indicating the vertical address 82 is recorded as a pointer P-TN02 of the third byte of the vertical address 12.

Start address data, that is $[01C4]_H$ cluster, $[00]_H$ sector, of the data zone $D_2$ is recorded as first to third bytes of the vertical address 76 designated by the pointer P-FRA data $[00]_H$ of the first byte of the vertical address 12. End address data, that is $[0383]_H$ cluster, $[1F]_H$ sector of the data zone $D_2$ is recorded as first to third bytes of the next vertical address 77. In addition, $[02]_H$ indicating the vertical address 80 is recorded as a pointer Link-P data of the fourth byte of the vertical address 77. Start address data, that is $[0546]_H$ cluster, $[00]_H$ sector, of the data zone $D_4$ is recorded as first to third bytes of the vertical address 80 designated by the pointer Link-P data $[02]_H$. End address data, that is $[0708]_H$ cluster, $[1F]_H$ sector of the data zone $D_4$ is recorded as first to third bytes of the next vertical address 81. Besides, $[00]_H$ indicating that there is no vacant zone contiguous to the data zone $D_4$ is recorded as a pointer Link-P data of the fourth byte of the vertical address 77.

Start address data, that is $[0000]_H$ cluster, $[00]_H$ sector, of the data zone $D_1$ in which the first play data are recorded is recorded as first to third bytes of the vertical address 78 designated by the pointer P-TN01 data $[01]_H$ of the second byte of the vertical address 12. End address data, that is $[01C4]_H$ cluster, $[1F]_H$ sector of the data zone $D_1$ is recorded as first to third bytes of the next vertical address 79. Besides, $[00]_H$ indicating that there is no vacant zone contiguous to the data zone $D_1$ is recorded as a pointer Link-P data of the fourth byte of the vertical address 79.

Start address data, that is $[0384]_H$ cluster, $[00]_H$ sector, of the data zone $D_3$ in which the second play data are recorded is recorded as first to third bytes of the vertical address 82 designated by the pointer P-TN02 data $[03]_H$ of the third byte of the vertical address 12. End address data, that is $[0545]_H$ cluster, $[1F]_H$ sector of the data zone $D_3$ is recorded as first to third bytes of the next vertical address 83. Besides, $[00]_H$ indicating that there is no vacant zone contiguous to the data zone $D_3$ is recorded as a pointer Link-P data of the fourth byte of the vertical address 83.

As described above, the recording/reproducing region $A_{20}$ of the optical disc 2 of the present embodiment has the data region $A_{21}$ in which data such as play data are recorded and the lead-in region $A_{22}$ provided radially inwardly of the data region $A_{21}$. As TOC data indicating the recording positions and recording contents of the recording data recorded in the data region $A_{21}$, track number table data made up of track number data indicating the continuous recorded data recorded in the data regions and address table data made up of address data indicating the positions of the data regions and linking address data indicating the linking destination from a given data region to another data region are recorded in the lead-in region $A_{22}$, so that the continuous recording data may be subdivided for being recorded in plural data zones. Besides, the continuous recording data may be easily and reliably managed by the track number data.

Figures 8, 9:
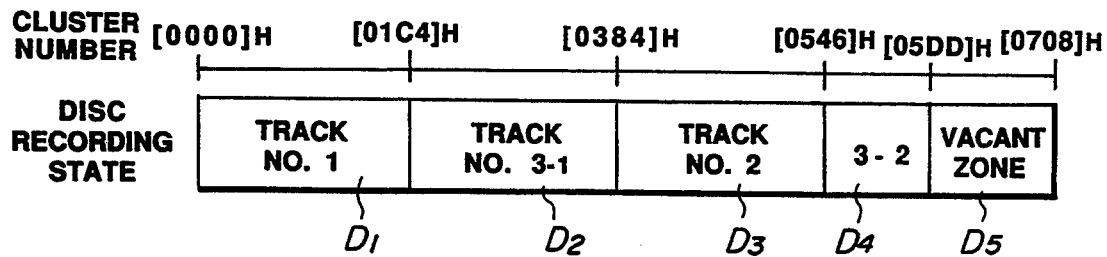
FIG. 8 is a diagrammatic view showing the recording state in the data regions when the third play data have been recorded from the recording state shown in FIG. 6.
FIG. 9 is a diagrammatic view showing the contents of TOC data associated with the recording state of the recording region of the disc shown in FIG. 8.

Third play data may be recorded across the data zones $D_2$ and $D_4$, as shown in FIG. 8. In this case, if recording of the third play data is terminated at the $[0546]_H$ cluster within the data zone $D_4$, the TOC data table is rewritten as indicated in FIG. 9, That is, a pointer P-TN03 data $[02]_H$ indicating the vertical address 80 is recorded in the fourth byte of the vertical address 12 as a pointer of address data indicating the position of the data zone in which the third play data are recorded. Since the third play data have been recorded across the data zones $D_2$, $D_4$, the vacant zone in which recording data may be recorded is a data zone $D_5$ from $[05DD]_H$ cluster to $[0708]_H$ cluster, so that start address data, that is $[05DD]_H$ cluster, $[00]_H$ sector, of the data zone $D_5$ is recorded as first to third bytes of the vertical address 76 designated by the pointer P-FRA data $[00]_H$ of the first byte of the vertical address 12, End address data, that is $[0708]_H$ cluster, $[1F]_H$ sector of the data zone $D_5$ is recorded as first to third bytes of the next vertical address 77. Besides, $[00]_H$ indicating that there is no vacant zone contiguous to the data zone $D_5$ is recorded as a pointer Link-P data of the fourth byte of the vertical address 77, Start address data, that is $[0104]_H$ cluster, $[00]_H$ sector, of the data zone $D_2$ is recorded as first to third bytes of the vertical address 80 designated by the pointer P-TN03 data $[02]_H$ of the fourth byte of the vertical address 12, End address data, that is $[0383]_H$ cluster, $[1F]_H$ sector of the data zone $D_2$ is recorded as first to third bytes of the vertical address 80 designated by power P-TN03 data $[02]_H$ of the fourth byte of the vertical address 12, End address data, that is $[0383]_H$ cluster, $[1F]$ sector of the data zone $D_2$ are recorded as first to third bytes of the next vertical address 80, Besides, $[04]_H$ indicating the vertical address 84 is recorded as a pointer Link-P data of the fourth byte of the vertical address 81, Besides, start address data, that is $[0546]_H$ cluster, $[00]_H$ sector, of the data zone $D_4$ is recorded as first to third bytes of the vertical address 84 designated by the pointer Link-P data $[04]_H$. End address data, that is $[05DC]_H$ cluster, $[1F]_H$ sector of the data zone $D_4$ is recorded as first to third bytes of the next vertical address 85. Besides, $[00]_H$ indicating that there is no vacant zone contiguous to the data zone $D_4$ is recorded as a pointer Link-P data of the fourth byte of the vertical address 77.

With the optical disc recording/reproducing apparatus of the present embodiment, a magnetic field modulated in accordance with recording data is applied by a magnetic head 4 to a magneto-optical disc 1 rotationally driven by the spindle motor 1, while a laser light is radiated on the disc by an optical head 3, for recording data along a recording track of the recording/reproducing region $A_{20}$ of the disc 2. Besides, a recording track of the read-only region $A_{10}$ and the recording/reproducing region $A_{20}$ of the magneto-optical disc 2 is traced by a laser light by the optical head 3 for optically reproducing the recorded data.

Figures 10, 14:
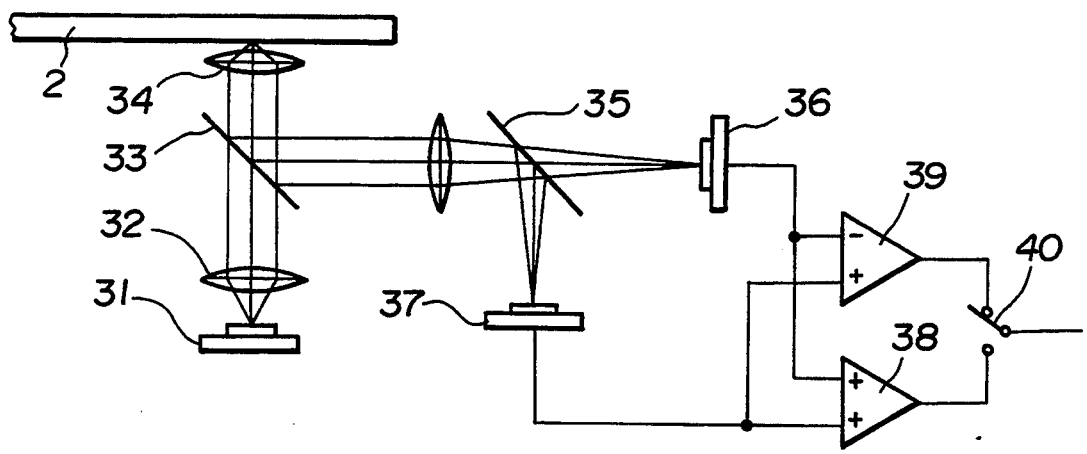
FIG. 10 is a block diagram showing the construction of an optical head employed in the disc recording/reproducing apparatus.
FIG. 14 shows another embodiment of TOC data recorded in a lead-in region of a disc according to the present invention.
Figure 11:
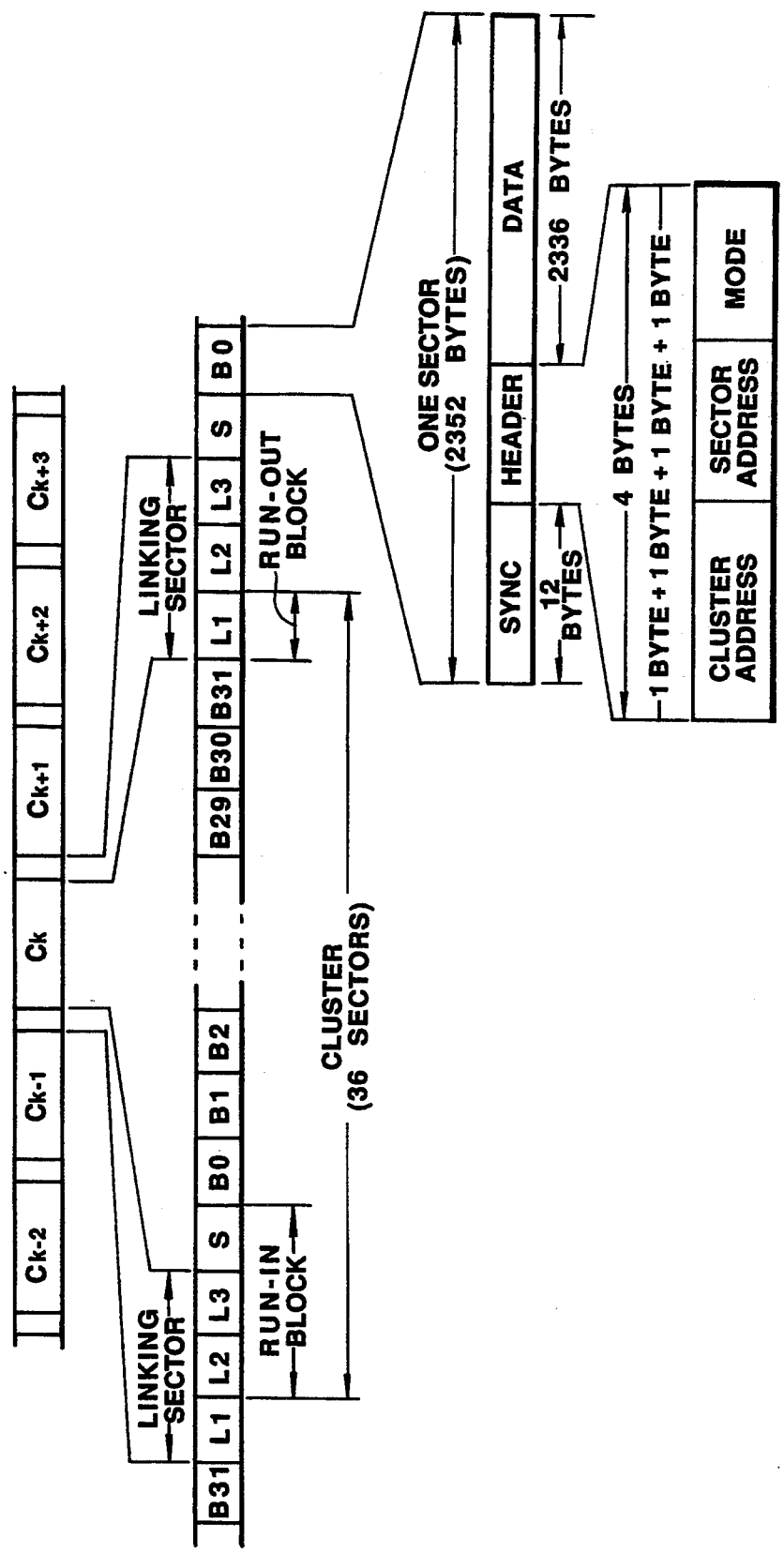
FIG. 11 shows the format of a cluster of recording data recorded in the recording/reproducing region of the magneto-optical disc.

Referring to FIG. 10, the optical head 3 is made up of optical components, such as a laser light source 31, e.g. a laser diode, a collimator lens 32, a beam splitter 33, an object lens 4 and a polarization beam splitter 35, first and second photodetectors 36, 37 for detecting the light split by the polarization beam splitter 35, first signal synthesizer 38 for summing and synthesizing detection outputs of the photodetectors 36, 37, and a second signal synthesizer 39 for subtractively synthesizing the detection outputs. The optical head 3 is mounted facing the magnetic head 4 with the magneto-optical disc 2 in-between. When recording data in the recording/reproducing region $A_{20}$ of the magneto-optical disc 2, the optical head 3 radiates a laser light to a target track of the magneto-optical disc 2, to which a magnetic field modulated in accordance with the recording data is applied by the magnetic head 4 driven by the head driving circuit 16 of the recording system as later described, for recording the data by thermomagnetic recording. The optical head 3 also detects the laser light reflected from the irradiated target track for detecting focusing errors by the so-called astigmatic method, while detecting tracking errors by the so-called push-pull method. When reproducing data from the read-only region $A_{10}$ of the magneto-optical disc 2, the optical head 3 detects changes in the light volume of the reflected light from the target track of the magneto-optical disc 2 for producing playback signals. Detection outputs by the photodetectors 36, 37 are summed and synthesized by the first signal synthesizer 38 to produce playback signals which are outputted via a changeover switch 40. When reproducing data from the recording/reproducing region $A_{20}$ of the magneto-optical disc 2, the playback signals may be produced by detecting the difference in the polarization angle (Kerr rotation angle) of the laser light reflected from the target track. Detection outputs of the photodetectors 36, 37 are subtractively synthesized by the second signal synthesizer 39 to produce playback signals which are supplied to changeover switch 40 which may be changed over depending on various operating modes by a system controller 7 which will be explained subsequently.

An output of the optical head 3 is supplied to an RF circuit 5 as shown in FIG. 3. The RF circuit 5 extracts the focusing error signals and tracking error signals from the output of the optical head 3 to supply the extracted signals to a servo control circuit 6, while converting the playback signals into binary-valued signals which are supplied to a decoder 21 of the reproducing system as later explained.

The servo control circuit 6 is made up of a focusing servo control circuit, a tracking servo control circuit, a spindle motor servo control circuit and a thread servo control circuit etc. The focusing servo control circuit focusing controls the optical system of the optical head 3 for reducing the focusing error signal to zero, The tracking servo control circuit tracking controls the optical system of the optical head 3 for reducing the tracking error signal to zero, The spindle motor servo control circuit controls the spindle motor 1 for rotationally driving the magneto-optical disc 2 at a predetermined rotational velocity, for example, at a constant linear velocity. The thread servo control circuit causes the optical head 3 and the magnetic head 4 to be moved to a target track of the magneto-optical disc 2 designated by system controller 7. The servo control circuit 6, producing the abovedescribed various control operations, transmits data indicating the operating states of the various parts control led by the circuit 6 to system controller 7.

A key unit 8 and a display 9 are connected to system controller 7. The system controller 7 controls the recording system and the reproducing system under the operating roods designated by the key input data entered by the key unit 8. The system controller 7 also controls the recording position or the playback position on the recording track traced by the optical head 3 and the magnetic head 4 based on the sector-by-sector address data reproduced from the recording track of the magneto-optical disc 2. The system controller 7 stores the TOC data read from the lead-in region $A_{12}$ of the read-only region $A_{10}$ of the magneto-optical disc 2 to control the playback position in the data region $A_{11}$ of the read-only region $A_{10}$ based on the TOC data. The system controller 7 also stores the TOC data read from the lead-in region $A_{22}$ of the read-only region $A_{20}$ of the magneto-optical disc 2 to control the recording position and the playback position in the data region $A_{21}$ of the read-only region $A_{20}$ based on the TOC data. During the recording mode, system controller 7 automatically generates the above-mentioned TOC data table, indicating the recording position in the data region $A_{21}$ of the recording/reproducing region $A_{20}$ for recording the generated TOC data table in the lead-in region $A_{22}$ on termination of the recording mode.

The recording system of the optical disc recording/reproducing system has an A/D converter 12 supplied with analog audio signals $A_{IN}$ from an input terminal 10 via a low-pass filter 11.

The A/D converter 12 quantizes the audio signals $A_{IN}$ to produce digital audio signals having a data rate of $2 \text{ ch} \times 16 \text{ bits} \times 44.1 \text{ kHz} = 1.4$ Mbits/second. The digital audio data from the A/D converter 12 are supplied to an adaptive transform acoustic coding (ATRAC) encoder 13.

The ATRAC encoder 13 analyzes the waveform on the time axis of the digital audio data of the data rate of 1.4 Mbits per second, quantized from the audio signals $A_{IN}$ by the A/D converter 12, into about 1,000 components on the frequency axis, by so-called orthogonal transform, with data of about 20 ms at the maximum as one block, for sequentially extracting the frequency components, beginning from those more critical to the human auditory sense, for generating digital audio data having the data rate of 300 k bits/second. That is, the operation of compressing the digital audio data having the data rate of 1.4 Mbits/second to digital audio data having the data rate of 300 kbits/second, which is about one-fifth is carried out. In this manner, the data transmission rate is converted from the rate of 75 sectors/second in the standard CD-DA format to about 15 sectors/second.

The memory 14 has its data writing and reading control led by the system controller 7 and is used for transiently storing the compressed audio data supplied from the ATRAC encoder 13 for subsequent recording on the disc when the necessity arises. That is, the compressed audio data supplied from the ATRAC encoder 13 has its data transfer rate reduced to about one-fifth of the standard data transfer rate of 75 sectors/second, that is to 15 sectors/second. It is these compressed data that are continuously written in the memory 14. Although it suffices to record the compressed data at a rate of one of five sectors of the compressed data, it is extremely difficult to record every five sectors on the real time basis. Consequently, recording is made in a burst-like manner at a data transfer rate of 75 sectors/second, with a cluster composed of a predetermined number of sectors, such as 32 plus several sectors, as a recording unit, with the interposition of a non-recording period. That is, the compressed audio data, written continuously in the memory 14 at a low transfer rate of 15(=75/5) sectors/second corresponding to the above-mentioned bit compression rate, are read as recording data in a burst fashion at the above-mentioned transfer rate of 75 sectors/second. The overall data transfer rate, inclusive of the non-recording period, of the read out and recorded data, is the above-mentioned low rate of 15 sectors/second, while the instantaneous data transfer rate within the time of the burst-like recording operation is 75 sectors/second.

The compressed audio data read out from memory 14 in a burst manner at the above-mentioned transfer rate of 75 sectors/second, that is the recorded data, are supplied to an encoder 15. The data of the data string, supplied from memory 14 to encoder 15 and recorded continuously in one recording operation, are a cluster composed of plural sectors, such as 32 sectors, and several cluster-linking sectors arrayed before and after the cluster. The cluster-linking sector is selected to be longer than the interleaving length at the encoder 15 so that data of other clusters is not affected by interleaving.

That is, the recording data in the optical disc recording/reproducing apparatus, that is data read out from memory 14, are arrayed into plural clusters each composed of a predetermined number of sectors, with several cluster-linking sectors arrayed between neighboring clusters. More concretely, a cluster C is composed of 32 sectors or blocks B0 to B31, a single sub-data sector S and three cluster-linking sectors L1 to L3, totaling 36 sectors, and is linked to neighboring clusters via the linking clusters L1 to L3. When recording a cluster, such as a Kth cluster $C_k$, not only the 32 sectors B0 to B31 and the subdata sector S, but also the two sectors L2, L3 towards the cluster $C_{k-1}$ (run-in blocks) and the sector L1 towards the cluster $C_{k+1}$ (run-out block), totaling 36 blocks, are recorded as a unit. These 36 sector recording data are transmitted from memory 14 to encoder 15 where the data are interleaved for re-arraying over a distance corresponding to up to 108 frames (equivalent to about 1.1 sector). However, data within the cluster $C_k$ are confined within the range from the run-in blocks L2, L3 to the run-out block L1 without affecting the adjacent sectors $C_{k-1}$ or $C_{k+1}$. Meanwhile, dummy data such as 0s are arrayed in the linking sectors L1 to L3 so that it is possible to avoid adverse effects of interleaving on intrinsic data.

By such cluster-by-cluster recording, it becomes unnecessary to take account of mutual intervention with the adjacent clusters due to interleaving so that data processing may be simplified significantly. Should it not be possible to effect regular recording of the recording data during recording, re-recording may be made on the cluster-by-cluster basis. On the other hand, should it not be possible to make effective data reading during reproduction, re-reading may be made on the cluster-by-cluster basis.

The encoder 15 effects encoding for error correction, such as parity appendage or interleaving, and EFM encoding, on the recording data supplied in a burst manner from memory 14 as described above. The recording data processed with encoding by encoder 15 are supplied to the magnetic head driving circuit 16. The magnetic head driving circuit 16 is connected to the magnetic head 4 for driving the magnetic head 4 for applying a magnetic field modulated in accordance with the recording data to the magneto-optical disc 2.

With the above-mentioned optical disc recording/reproducing apparatus, the digital data obtained by the A/D converter 12 are audio PCM data having the sampling frequency of 44.1 kHz, the number of quantization bits of 16 and the data transfer rate of 75 sectors/second. The compressed audio data, continuously outputted from ATRAC encoder 13 at the transfer rate of 15 sectors/second, are supplied to memory 14.

Figure 12:
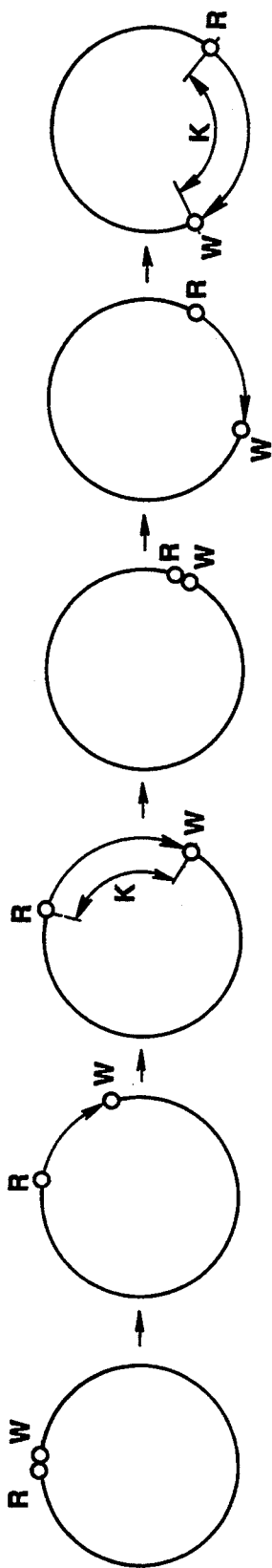
FIG. 12 is a schematic view showing the states of a memory control led in a recording system of the optical disc recording/reproducing apparatus.

Referring to FIG. 12, the system controller 7 controls the memory 14 in such a manner that the compressed audio data are continuously written in memory 14 at the transfer rate of 15 sectors/second by continuously incrementing write pointer W of the memory 14 at the transfer rate of 15 sectors/second and, when the volume of the compressed data stored in memory 14 exceeds a predetermined volume K, the compressed audio data are read in a burst manner from memory 14 as recording data by the above volume K at the transfer rate of 75 sectors/second by incrementing a read pointer R of memory 14 in a burst fashion at the transfer rate of 75 sectors/second.

With the above-described memory control by the system controller 7, the compressed audio data continuously outputted from the ATRAC encoder 13 at the transfer rate of, for example, 15 sectors/second, are written in memory 14 at the abovementioned transfer rate of 15 sectors/second and, when the data volume stored in memory 14 exceeds the predetermined volume K, the compressed audio data are read from memory 14 by the above volume K as the recording data, so that input data may be continuously written in memory 14 while a data writing region in more than a predetermined volume may perpetually be maintained in memory 14.

It is noted that the recording data read out in a burst manner from memory 14 may be recorded in a continuous state on a recording track of the magneto-optical disc 2 by controlling the recording position on the recording track of the magneto-optical disc 2 by system controller 7. Besides, since the data writing region in excess of the predetermined volume is maintained at all times in memory 14, input data may be written in the data writing region in excess of the predetermined volume even when system controller 7 detects the occurrence of track jumps to discontinue the recording operation on the magneto-optical disc 2 so that the operation of restoration may be performed in the interim. In this manner, input data may be continuously written on the recording track of the magneto-optical disc 2.

The reproducing system of the optical disc recording/reproducing apparatus is hereinafter explained.

The reproducing system is designed to reproduce the recording data continuously recorded on the recording tracks of the read-only region $A_{10}$ and the recording/reproducing region $A_{20}$ of the magneto-optical disc 2, and is provided with a decoder 21 to which a playback output produced upon tracing the recording track of the magneto-optical disc 2 with a laser light from the optical head 3, that is the playback signals from the read-only region $A_{10}$ outputted via changeover switch 40 from the first signal synthesizer 38 or the playback signals from the recording/reproducing region $A_{20}$ outputted via changeover switch 40 from the second signal synthesizer 39, is supplied after conversion into binary-valued signals by the RF circuit 5.

The decoder 21 is the counterpart of the encoder 15 of the above-described recording system and effects the above-mentioned decoding for error correction and EFM decoding on the binary-valued playback output from RF circuit 5 to reproduce the compressed audio data at the transfer rate of 75 sectors/second. The playback data from decoder 21 are supplied to a memory 22. The memory 22 has data reading and writing controlled by system controller 7 so that the playback data supplied from decoder 21 at the transfer rate of 75 sectors/second are written in the memory 22 at the transfer rate of 75 sectors/second. Also the playback data written in the burst manner in memory 22 at the transfer rate of 75 sectors/second are continuously read at the transfer rate of 15 sectors/second.

The system controller 7 causes the TOC data read out from the lead-in region $A_{12}$ of the read-only region $A_{10}$ or the lead-in region $A_{22}$ of the recording/reproducing region $A_{20}$ of the magneto-optical disc 2 to be stored in TOC memory 20 to control the recording position or the reproducing position in the data region $A_{11}$ of the read-only region $A_{10}$ or the data region $A_{21}$ of the recording/reproducing region $A_{20}$ based on the TOC data.

The system controller 7 controls the memory 22 in such a manner that the playback data are written in the memory 22 at the transfer rate of 75 sectors/second and the playback data are Continuously read from memory 22 at the above-mentioned transfer rate of 15 sectors/second, while controlling the playback position so that the playback data written therein in a burst manner from memory 22 by the above memory control will be continuously reproduced from the recording track of the magneto-optical disc 2. The playback position is controlled by controlling the playback position of the playback data read out in a burst manner from memory 22 by system controller 7 and by supplying a control signal designating the playback position on the recording track of the magneto-optical disc 2 to the servo control circuit 6.

Figure 13:
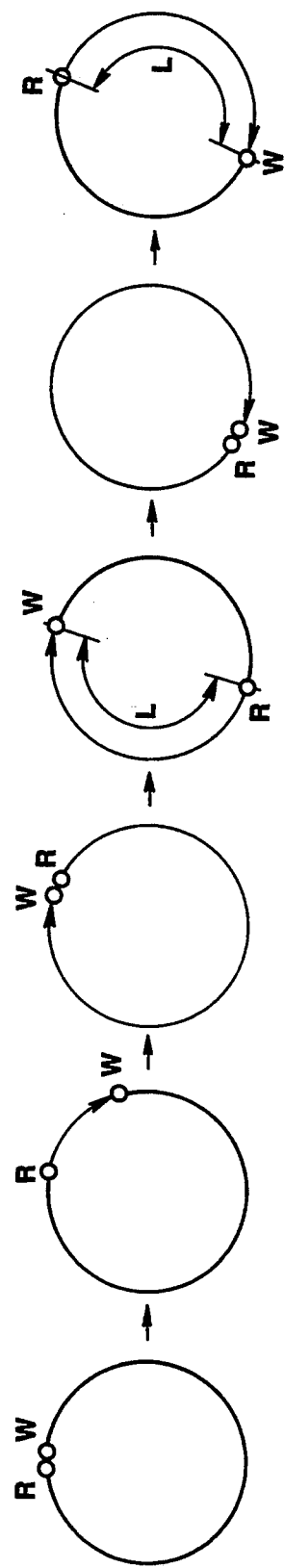
FIG. 13 is a schematic view showing the states of a memory control led in a reproducing system of the optical disc recording/reproducing apparatus.

Referring to FIG. 13, the system controller 7 controls the memory 22 by incrementing the write pointer W of memory 22 at the transfer rate of 75 sectors/second for writing the playback data in memory 22 at the transfer rate of 75 sectors/second, continuously incrementing the read pointer R of memory 22 at the transfer rate of 15 sectors/second for continuously reading the playback data from memory 22 at the transfer rate of 15 sectors/second, discontinuing the writing when the write pointer W has overtaken the read pointer R and again incrementing the write pointer W in a burst manner at the transfer rate of 75 sectors/second for writing the data when the data volume of the playback data stored in memory 22 is lesser than the predetermined data volume L.

By the above-described memory control by the system controller 7, the compressed audio data reproduced from the recording track of the magneto-optical disc 2 may be written in memory 22 in a burst manner at the transfer rate of 75 sectors/second and read out continuously from memory 22 as playback data at the transfer rate of 15 sectors/second, so that the playback data may be continuously read from memory 22 while a data volume in excess of the predetermined volume L is perpetually maintained in memory 22 On the other hand, the playback data read out in a burst manner from the magneto-optical disc 2 may be reproduced in a continuous state from the recording track of the magneto-optical disc 2 by controlling the playback position on the recording track of the magneto-optical disc 2 by system controller 7. Besides, since the data readout region in excess of the predetermined volume L is perpetually maintained in memory 22, the playback data may be read from the data readout region in excess of the predetermined volume L to continue the outputting of the analog audio signals even when the system controller 7 detects the occurrence of a track jump by disturbances to discontinue the reproducing operation, and the operation of restoration may be carried out in the interim.

The compressed audio data continuously read out from memory 22 at the transfer rate of 15 sectors/second are supplied to an ATRAC decoder 23. The ATRAC decoder has its operating mode designated by system controller 7 and, with the present disc recording/reproducing apparatus, expands the compressed audio data by a factor of five to reproduce the digital audio data having the transfer rate of 75 sectors/second. The digital audio data from ATRAC decoder 23 are supplied to a D/A converter 24.

The D/A converter 24 converts the digital audio data from ATRAC decoder 23 into an analog form to produce analog audio signals $A_{OUT}$ which are outputted via a low-pass filter 25 at an output terminal 28.

Meanwhile, the reproducing system of the present optical disc recording/reproducing apparatus has a digital outputting function so that the digital audio data from the ATRAC decoder 23 may be outputted via a digital output encoder 27 at a digital output terminals 26 as digital audio signals $D_{OUT}$.

With the above described embodiment of the optical disc recording/reproducing apparatus, the recording/reproducing region $A_{20}$ of the optical disc 2 has the data region $A_{21}$, in which data such as play data are recorded and the lead-in region $A_{22}$ arranged radially inwardly of the data region $A_{21}$, and track number table data made up of track number data indicating continuous recording data recorded in the data region and address table data made up of address data indication the positions of data zones and linking address data indicating the destination of linking from one to another data zone are stored in the leading region $A_{22}$, so that the continuous recording data may be subdivided and recorded in plural recording zones. Besides, by controlling the reproducing position of the data region $A_{21}$ based on the TOC data read from the lead-in region $A_{22}$, the continuous recording data subdivided and recorded in the plural data regions of the recording/reproducing region $A_{20}$ may be reproduced. In addition, the continuous recording data may be easily and reliably controlled by the track number table data.

In the embodiment shown, the TOC data generated in the TOC data table having the track number table and the address table as shown in FIG. 5 are recorded in the lead-in region $A_{22}$ of the recording/reproducing region $A_{20}$. However, as shown in FIG. 14, a linking flag region indicating the presence or absence of linking destination from one to another data region may be provided in the TOC data of the CD-MO format and the address data indicating the plural recording positions and the linking flag may be recorded in the lead-in region $A_{22}$ for the recording data of the common track number $TNO_n$.

In the above-described disc recording apparatus of the present invention, continuous recording data may be subdivided and recorded by data recording means in plural data zones of the disc, while the track number data indicating the continuous recording data recorded in the recording regions, the address data indicating the positions of the data regions and the address data indicating the destination of linking from one to another data zones are recorded in the lead-in region of the disc, so that the continuous recording data may be subdivided and recorded in the plural recording zones, In the disc reproducing apparatus of the present invention, the disc in which continuous recording data are subdivided and recorded in plural data regions, and in which the track number data indicating the continuous recording data recorded in each data region, address data indicating the position of each data region and linking address data indicating the linking destination from one to another data region are recorded in the lead-in region, is reproduced by reading the track number data, address data and the linking address data from the lead-in region by lead-in data reproducing means, and by reading the continuous recording data from the plural data regions of the disc by reproducing means based on the track number data, address .data and the linking address data, so that the continuous recording data may be reproduced from the plural data regions in which the continuous recording data are subdivided and recorded in the subdivided state.

Besides, with the disc of the present invention, the continuous recording data are subdivided and recorded in the plural data regions, while the track number data indicating the continuous recording data recorded in each data region, the address data indicating the positions of the data regions and the inking address data indicating the linking destination from one to another data region, are recorded in the lead-in region, so that the continuous recording data may be recorded and/or reproduced via the plural data regions.

What is claimed is:

1. A disc recording apparatus in which compressed input data are stored in a memory and read out therefrom in a burst manner for being recorded in a data region of a disc, and in which data indicating the recording contents of a recording region are recorded in a lead-in region of said disc, comprising:
   data recording means for subdividing continuous compressed input data and for recording the subdivided continuous compressed input data in plural non-continuous data zones on said disc; and
   lead-in data recording means for recording in said lead-in region track number data associated with the continuous compressed input data, address data indicating the positions of said data zones associated with said track number data and address data indicating a linking destination of said subdivided continuous compressed input data recorded in a given data region.

2. A disc recording apparatus in which compressed input data are stored in a memory and read out therefrom in a burst manner for being recorded in a data region of a disc, and in which data indicating the recording contents of a recording region are recorded in a lead-in region of said disc, comprising:
   data recording means for subdividing continuous compressed input data and for recording the subdivided continuous compressed input data in plural non-continuous data zones on said disc; and
   lead-in data recording means for recording in said lead-in region track number data associated with the continuous compressed input data, address data indicating the positions of said data zones associated with said track number data, address data indicating a linking destination of said subdivided continuous compressed input data recorded in a given data region, and data indicating the position in said lead-in region in which address data of another data zone to be linked with said given data zone.

3. A disc recording apparatus in which compressed input data are stored in a memory and read out therefrom in a burst manner for being recorded in a data region of a disc, and in which data indicating the recording contents of a recording region are recorded in a lead-in region of said disc, comprising:
   data recording means for subdividing continuous compressed in data and for recording subdivided continuous compressed input data in plural non-continuous data zones on said disc, and
   lead-in data recording means for generating a track number table including track number data associated with the continuous compressed data and an address data table including address data indicating the position of the data zones associated with the track number data and address data indicating a linking destination of the compressed data recorded in a given data zone and for recording data of said tables in said lead-in region of said disc.

4. The disc recording apparatus as defined in claim 1 wherein leading address data of said subdivided continuous compressed input data are recorded at a position in an address data table associated with said track number.

5. The disc recording apparatus as defined in claim 4 wherein simultaneously with the address data for the subdivided continuous compressed input data recorded in a given data zone, data indicating the position in said address data table in which address data of another data zone to be linked with said given data zone are recorded in said address data table.

6. A disc reproducing apparatus for reproducing continuous digital data from a disc in which said continuous digital data are compressed and subdivided for being recorded in noncontinuous data zones therein and in which track number data associated with said continuous compressed data, address data indicating the position of data zones associated with said track number data and linking address data indicating the linking destination of the compressed data recorded in one of said data zones are recorded in a lead-in region therein, comprising:

lead-in data reproducing means for reproducing the track number data, address data and linking address data recorded in said lead-in region, data reproducing means for reproducing the continuous compressed data from said disc based on the track number data, address data and the linking address data reproduced by said lead-in data reproducing means, a memory for storing the compressed data reproduced by said data reproducing means and sequentially outputting the stored compressed data at a predetermined transfer rate, and data expanding means for expanding the compressed data read out from said memory.

7. The disc, reproducing apparatus as defined in claim 6 wherein said data reproducing means reproduce the continuous digital data by reproducing the compressed data recorded in a given one of the data zones based on said address data and accessing another linking data zone on said disc based on said linking address data.

8. A disc-shaped recording region comprising:

plural data zones in which continuous digital data are recorded after compression followed by subdivision, and a lead-in region in which track address data associated with said subdivided compressed continuous digital data, address data indicating the position of each data zone associated with track number data, and linking address data indicating the linking destination of the compressed data recorded in one of a plurality of recording zones, are recorded.

* * * * *

UNITED STATES PATENT AND TRADEMARK OFFICE
CERTIFICATE OF CORRECTION

PATENT NO. : 5,388,093
DATED : February 7, 1995
INVENTOR(S) : Tadao Yoshida, et al.

It is certified that error appears in the above-indentified patent and that said Letters Patent is hereby corrected as shown below:

In col. 3, line 56, replace "¢" with --"--.

In col. 5, line 33, replace "," with --.--.

In col. 5, line 68, replace "," with --.--.

In col. 13, line 46, replace "Continuously" with --continuously--.

In col. 16, line 34, replace "in" with --input--.

Signed and Sealed this

Second Day of May, 1995

Attest:

BRUCE LEHMAN

*Attesting Officer*            *Commissioner of Patents and Trademarks*